(12) United States Patent
Fukui

(10) Patent No.: US 10,983,098 B2
(45) Date of Patent: Apr. 20, 2021

(54) LIQUID CHROMATOGRAPH

(71) Applicant: SHIMADZU CORPORATION, Kyoto (JP)

(72) Inventor: Wataru Fukui, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 16/624,587

(22) PCT Filed: Sep. 14, 2017

(86) PCT No.: PCT/JP2017/033297
§ 371 (c)(1),
(2) Date: Dec. 19, 2019

(87) PCT Pub. No.: WO2019/053850
PCT Pub. Date: Mar. 21, 2019

(65) Prior Publication Data
US 2020/0132642 A1   Apr. 30, 2020

(51) Int. Cl.
*G01N 30/72* (2006.01)
*G01N 30/02* (2006.01)

(52) U.S. Cl.
CPC ... *G01N 30/7233* (2013.01); *G01N 2030/027* (2013.01)

(58) Field of Classification Search
CPC ............ G01N 30/7233; G01N 2030/027
See application file for complete search history.

(56) References Cited

U.S. PATENT DOCUMENTS 4,178,507 A * 12/1979 Brunnee ............... G01N 27/68
250/282
5,572,023 A   11/1996 Caprioli
(Continued)

FOREIGN PATENT DOCUMENTS

JP     2015-014616 A    1/2015
JP        5975158    *  1/2016

OTHER PUBLICATIONS

Machine translation of JP2016001192A, in patent family of JP 5975158 (Year: 2016).*

(Continued)

*Primary Examiner* — David J Bolduc
(74) *Attorney, Agent, or Firm* — Sughrue Mion, PLLC

(57) ABSTRACT

A liquid chromatograph includes a column 13, a liquid sending unit 11 configured to send a mobile phase to the column 13 at a pressure higher than atmospheric pressure, a first pipe 201a having one end connected to an outlet of the column 13, and a second pipe 201b having one end connected to an end face at the other end of the first pipe 201a with a connection gap sandwiched between the one end of the second pipe and end face, the second pipe 201b having the other end disposed in an ionization chamber 20 having a pressure less than or equal to atmospheric pressure. The liquid chromatograph charges a component of a sample contained in a liquid flowing out from the column 13 by applying voltage to the connection gap, and inner diameters and lengths of the first pipe 201a and the second pipe 201b are determined such that the liquid flowing out from the column 13 passes through the connection gap while maintaining pressure greater than or equal to a saturated vapor pressure of the mobile phase.

1 Claim, 2 Drawing Sheets

(56) References Cited

U.S. PATENT DOCUMENTS

| | | | | |
|---|---|---|---|---|
| 9,196,468 | B2* | 11/2015 | Campbell | H01J 49/0081 |
| 10,593,532 | B2* | 3/2020 | Gebhardt | H01J 49/167 |
| 2003/0087454 | A1* | 5/2003 | Schultz | B01L 9/06 |
| | | | | 436/161 |
| 2008/0315083 | A1* | 12/2008 | Lubda | H01J 49/0404 |
| | | | | 250/288 |
| 2010/0001181 | A1* | 1/2010 | Moini | G01N 27/4473 |
| | | | | 250/282 |
| 2011/0101215 | A1* | 5/2011 | Hirabayashi | H01J 49/0009 |
| | | | | 250/282 |
| 2011/0204223 | A1* | 8/2011 | Nakano | H01J 49/0495 |
| | | | | 250/288 |
| 2015/0102232 | A1* | 4/2015 | Satake | G01N 27/62 |
| | | | | 250/424 |
| 2015/0298025 | A1* | 10/2015 | Schultz | G01N 30/6004 |
| | | | | 73/61.58 |
| 2016/0209377 | A1* | 7/2016 | Goto | F16K 25/005 |
| 2016/0266017 | A1* | 9/2016 | Kennedy | H01J 49/165 |
| 2018/0284083 | A1* | 10/2018 | Ishimaru | G01N 30/724 |

OTHER PUBLICATIONS

Machine translation of JP 2015014616 (Year: 2015).*
"Connector Adapter Union," [online], MS Equipment Co., Ltd., [Search on Aug. 9, 2017], Internet.
"Cavitation," Internet <https://www.tlv.com/ja/steam_story/0708flash_steam2.html>.
"Flash steam," Internet <https://www.tlv.com/ja/steam_story/1406cavitation.html>.
"Cavitation and flushing," Internet (Homepage of Motoyama Eng. Works Ltd.) <http://www.motoyama-cp.co.jp/technology/cavitation.html>.
Written Opinion of the International Searching Authority of PCT/JP2017/033297 dated Dec. 5, 2017.
International Search Report of PCT/JP2017/033297 dated Dec. 5, 2017.

* cited by examiner

LIQUID CHROMATOGRAPH

CROSS REFERENCE TO RELATED APPLICATIONS

This application is a National Stage of International Application No. PCT/JP2017/033297 filed Sep. 14, 2017.

TECHNICAL FIELD

The present invention relates to a liquid chromatograph in which components contained in a liquid flowing out from a column are ionized by electrospray ionization and measured.

BACKGROUND ART

A liquid chromatograph is widely used as an apparatus that analyzes a component contained in a liquid sample. In the liquid chromatograph, the liquid sample is introduced into a column on a flow of a mobile phase flowing at a predetermined pressure (several MPa to several tens of MPa), and various components contained in the liquid sample are temporally separated, and measured with a detector. The liquid chromatograph having a mass spectrometer as the detector is called a liquid chromatograph mass spectrometer. In the liquid chromatograph mass spectrometer, various components sequentially flowing out from the column of the liquid chromatograph are introduced into an ion source of the mass spectrometer and ionized, and the generated ions are measured in each mass-to-charge ratio.

One of ionization methods used in the liquid chromatograph mass spectrometer is an electrospray ionization (ESI) method, in which various components are ionized by charging the liquid flowing out from the column of the liquid chromatograph and nebulizing the charged liquid in the ionization chamber at atmospheric pressure. In the ESI method, the liquid flowing out from the column is introduced into the ESI sprayer to which a high voltage is applied and charged, and a nebulizer gas is sprayed on the charged liquid at a tip of the ESI sprayer, and nebulized and ionized in the ionization chamber.

In the liquid chromatograph mass spectrometers, so-called nano-ESI or micro-ESI is widely used in recent years to measure a very small amount of components contained in a sample with high sensitivity. In the nano-ESI or the micro-ESI, a small-diameter column is used, and the amount of liquid (liquid flowing out from the column) per unit time introduced into the ESI sprayer is reduced by controlling the flow rate of the mobile phase from a nL/min level to a μL/min level. This increases charging efficiency or facilitates desolvation, and thus increases ionization efficiency.

In the nano-ESI and the micro-ESI, small-diameter pipes having an outer diameter of several hundred micrometers and an inner diameter of several tens of micrometers are used. For the pipes, material, such as fused silica, having easy microfabrication characteristics and low substance adsorption is used.

Since fused silica is an insulator, liquid flowing through the pipe made of fused silica cannot be charged from outside of the pipe. Conventionally, a couple of ESI sprayer semi-pipes are inserted into a connection member made of a conductive material from both ends of the connection member with the both ends of the semi-pipes separated from each other inside of the connection member, and a high voltage is applied to the connection member to charge the liquid flowing the column at the separated portion (for example, see Patent Literature 1 and Non Patent Literature 1).

CITATION LIST

Patent Literature

Patent Literature 1: JP 2015-14616 A

Non Patent Literature

Non Patent Literature 1: "Connector Adapter Union", [online], MS Equipment Co., Ltd., [Search on Aug. 9, 2017], Internet

SUMMARY OF INVENTION

Technical Problem

The present inventor performed measurement using nano-ESI or micro-ESI having a configuration in which the liquid in the fused silica pipe is charged through the conductive connecting member as described above, where an infusion analysis was conducted in which the liquid sample was continuously injected into the mass spectrometer at a constant flow rate using the liquid chromatograph pump. It was found that sometimes measurement intensity of ions derived from the components contained in the liquid sample decreased intermittently, and that such a phenomenon was not generated in the analysis at a semi-micro flow rate such as several hundreds uL/min, but was generated notably at a low flow rate of 10 μL/min or less. Thus, when the conventional liquid chromatograph is used, there is a problem in that the intensity of the ions derived from various components contained in the liquid sample cannot correctly be measured in the analysis in which the nano ESI or the micro ESI is used.

The problem to be solved by the present invention is to provide a liquid chromatograph that correctly measures the intensity of ions derived from the components contained in liquid flowing out from a column when the components contained in the liquid are ionized and measured by electrospray ionization.

Solution to Problem

A study of the inventor about a cause of the above problem will be described first.

In the liquid chromatograph, the mobile phase is sent to the column at a pressure of several MPa to several tens of MPa. In the liquid chromatograph using the nano-ESI or the micro-ESI, an outlet of the column is connected to the ionization chamber of the mass spectrometer open to the atmospheric pressure through a small-diameter pipe. Thus, the pressure of the mobile phase sent at a high pressure of several tens of MPa and introduced into the column decreases to the atmospheric pressure (0.1 MPa) while the mobile phase flows through the column and the pipe connected to the outlet of the column and reaches the ionization chamber. Magnitude (gradient) of the pressure decrease in the mobile phase during that time depends on the flow channel resistance of the flow channel through which the mobile phase passes.

The flow channel in the column is densely filled with a carrier coated with a stationary phase, an adsorbent, or the like. On the other hand, the flow channel from the outlet of the column to the ionization chamber is hollow. Thus, the flow channel resistance of the flow channel from the outlet of the column to the ionization chamber is smaller than the flow channel resistance of the flow channel in the column. For this reason, the pressure of the mobile phase sent at several tens of MPa does not decrease so much in the column, but rapidly decreases when the mobile phase flows out from the column to reach the hollow flow channel.

A substance used as the mobile phase is water, acetonitrile, or the like which is liquid at room temperature and normal pressure, and the saturated vapor pressure of these substances are less than the atmospheric pressure. However, when the pressure of the liquid rapidly decreases to locally fall below the saturated vapor pressure, bubbles are generated inside the liquid. Such a phenomenon is called "flash evaporation" or "cavitation". The inventor considered that this phenomenon is generated in the liquid flowing out from the column, so that bubbles might be generated inside the liquid flowing out from the column. When the liquid containing the bubbles is introduced into the ESI sprayer and reaches the connection member, the high voltage applied to the connection member is blocked by the bubbles, the liquid is not charged, and the ion generation efficiency decreases. The inventors considered that this is the cause of the decrease in the measured intensity of the ions. Additionally, with decreasing flow rate of the liquid, the time during which the bubbles exist in the connecting member is lengthened, and the time during which the ions are not charged is lengthened. For this reason, the inventor has conceived that the more the intermittent decrease in the ionic strength appears notably with decreasing flow rate.

One aspect of the present invention is a liquid chromatograph comprising:

a) a column;

b) a liquid sending unit configured to send a mobile phase to the column at a pressure higher than atmospheric pressure;

c) a first pipe having one end connected to an outlet of the column; and d) a second pipe having one end connected to an end face at the other end of the first pipe with a connection gap sandwiched between the one end of the second pipe and the end face, the second pipe having the other end disposed in an ionization chamber having a pressure less than or equal to atmospheric pressure. The liquid chromatograph charges a component of a sample contained in a liquid flowing out from the column by applying voltage to the connection gap, and inner diameters and lengths of the first pipe and the second pipe are determined such that the liquid flowing out from the column passes through the connection gap while maintaining the pressure to be greater than or equal to the saturated vapor pressure of the mobile phase.

In the conventional liquid chromatograph, the reason why the pressure of the liquid flowing out from the column suddenly decreases is that the difference between the flow channel resistance in the column and the flow channel resistances of the first pipe and the second pipe connected to the outlet of the column is large. For this reason, in the liquid chromatograph of the present invention, the inner diameters and the lengths of the first pipe and the second pipe are determined such that the liquid flowing out from the column passes through the connection gap while maintaining the pressure greater than or equal to the saturated vapor pressure of the mobile phase. More specifically, the inner diameters of the first pipe and/or the second pipe are decreased and/or the lengths of the first pipe and/or the second pipe are increased as compared with those of the conventional liquid chromatograph, thereby decreasing the difference between the flow channel resistance in the column and the flow channel resistance on the downstream side of the column. The rapid decrease in the pressure of the liquid flowing out from the column is reduced, and the liquid flowing out from the column is introduced into the connection gap while maintaining the pressure greater than or equal to the saturated vapor pressure (that is, without generating bubbles). Consequently, generation of bubbles can be prevented in the liquid, the charging efficiency in the connection gap is stabilized to generate the ions with a constant efficiency, and the ions can be measured with correct intensity.

In the liquid chromatograph, the amount of pressure decrease of the liquid flowing out from the column depends on measurement conditions (specifically, the liquid sending pressure by the liquid sending unit, the column type, and the liquid type). For this reason, the specific inner diameters and lengths of the first pipe and the second pipe may be determined based on the measurement conditions.

The flow of the mobile phase in the pipe of the liquid chromatograph is classified as a laminar flow in a circular pipe from a value of a Reynolds number Re obtained by the following equation (1) using density $\rho$ of the liquid, viscosity $p$, flow velocity U, and a pipe length d as parameters. The magnitude of the pipe resistance $\Delta P$ in the laminar flow in the circular pipe can be obtained from a flow rate Q, an inner diameter R of the pipe, and a length L of the pipe. From the following equation (2), when the inner diameter R of the pipe is decreased and when the pipe length L is increased, the pipe resistance increases. Thus, the flash evaporation and the cavitation are prevented by appropriately determining these values, the charging efficiency of the liquid flowing out from the column is stabilized, and the intensity of ions derived from the components contained in the liquid flowing out from the column can be correctly measured.

[Mathematical formula 1]

$$Re = \frac{\rho U d}{\mu} \qquad (1)$$

[Mathematical formula 2]

$$\Delta P = \frac{8 \mu Q L}{\pi R^4} \qquad (2)$$

Advantageous Effects of Invention

Use of the liquid chromatograph of the present invention allows correct measurement of the intensity of ions derived from components contained in the liquid flowing out from the column.

DESCRIPTION OF EMBODIMENTS

Figure 1:
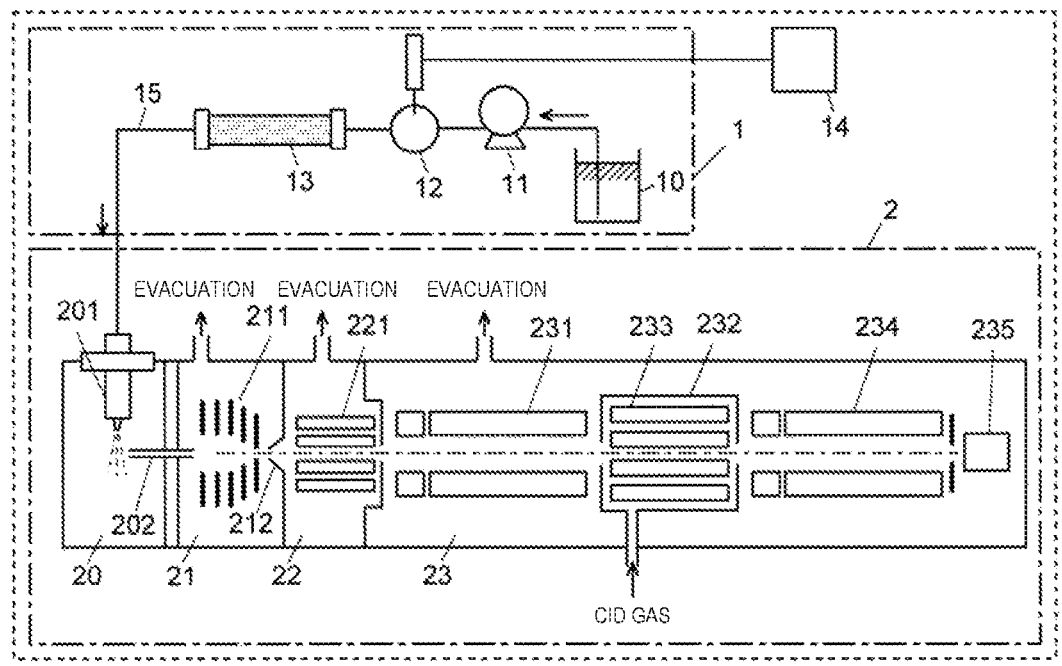
FIG. 1 is a configuration diagram illustrating a main part of a liquid chromatograph mass spectrometer that is an embodiment of a liquid chromatograph according to the present invention.

A liquid chromatograph mass spectrometer that is an embodiment of a liquid chromatograph according to the present invention will be described below with reference to the drawings.

The liquid chromatograph mass spectrometer of the embodiment is roughly constructed with a liquid chromatograph 1, a mass spectrometer 2, and a controller (not illustrated) that controls operation of the liquid chromatograph 1 and the mass spectrometer 2.

The liquid chromatograph 1 includes a mobile phase container 10 in which a mobile phase is stored, a pump 11 that sucks the mobile phase and delivers the mobile phase at a constant flow rate, an injector 12 that injects a predetermined amount of sample liquid into the mobile phase, and a column 13 that separates various compounds contained in the sample liquid in a time direction. The liquid chromatograph 1 is connected to an autosampler 14 that introduces a plurality of liquid samples into the injector 12 one by one in predetermined order and timing.

The mass spectrometer 2 has a configuration of a multistage differential exhaust system including a first intermediate vacuum chamber 21 and a second intermediate vacuum chamber 22 in which a degree of vacuum increases stepwise between a ionization chamber 20 at an approximately atmospheric pressure and a high-vacuum analysis chamber 23 evacuated by a vacuum pump (not illustrated). An electrospray ionization (ESI) probe 201 that nebulizes a sample solution while applying a charge to the sample solution is installed in the ionization chamber 20. The ionization chamber 20 and the first intermediate vacuum chamber 21 communicate with each other through a heated capillary 202. The first intermediate vacuum chamber 21 and the second intermediate vacuum chamber 22 are separated by a skimmer 212 including a small hole at the top, and a first ion guide 211 and a second ion guide 221 are installed in the first intermediate vacuum chamber 21 and the second intermediate vacuum chamber 22, respectively. The first ion guide 211 and the second ion guide 221 transport ions to a subsequent stage while converging the ions. In the analysis chamber 23, a front-stage quadrupole mass filter (Q1) 231 that separates the ions according to a mass-to-charge ratio is installed on a front-stage side, and a rear-stage quadrupole mass filter (Q3) 234 that also separates the ions according to the mass-to-charge ratio and an ion detector 235 are installed on a rear-stage side. A collision cell 232 in which a multipole ion guide (q2) 233 is installed is sandwiched between the front-stage quadrupole mass filter (Q1) 231 and the rear-stage quadrupole mass filter (Q3) 234. A collision-induced dissociation (CID) gas such as argon and nitrogen gas is appropriately supplied into the collision cell 232 according to measurement conditions.

The mass spectrometer 2 can perform selected ion monitoring (SIM) measurement, MS/MS scan measurement (product ion scan measurement), multiple reaction monitoring (MRM) measurement, and the like. In the SIM measurement, the ions are not sorted by the front-stage quadrupole mass filter (Q1) 231 (not functioning as a mass filter), and the ions are detected while the mass-to-charge ratio of the ions passing through the rear-stage quadrupole mass filter (Q3) 234 is fixed.

On the other hand, in the MS/MS scan measurement and the MRM measurement, both the front-stage quadrupole mass filter (Q1) 231 and the rear-stage quadrupole mass filter (Q3) 234 function as the mass filters. The first-stage quadrupole mass filter (Q1) 231 passes only the ions having the mass-to-charge ratio set as precursor ions. A CID gas is supplied into the collision cell 232, and the precursor ions are cleaved to generate product ions. In the MS/MS scan measurement, the product ions are detected while the mass-to-charge ratio of the ions passing through the rear-stage quadrupole mass filter (Q3) 234 is scanned. In the MRM measurement, the product ions are detected while the mass-to-charge ratio of the ions passing through the rear-stage quadrupole mass filter (Q3) 234 is fixed. In the embodiment, a triple quadrupole type mass spectrometer is used as the mass spectrometer. Alternatively, a mass spectrometer having another configuration (such as a single quadrupole type, an ion trap-time-of-flight type, and the like) may be used.

One of the features of the liquid chromatograph mass spectrometer of the embodiment is a configuration (design concept) of the pipe through which the mobile phase containing the liquid sample flows from an outlet of the column 13 to the ionization chamber 20. This point will be described below. The liquid sample injected from the injector 12 is a very small quantity as compared to the mobile phase, and characteristics (such as a saturated vapor pressure and viscosity) of the liquid of the mobile phase after the liquid sample is injected are almost the same as characteristics of the mobile phase. For this reason, hereinafter, not only the pure mobile phase but also the mobile phase after the liquid sample is injected are referred to as a "mobile phase" for convenience.

Figure 2:
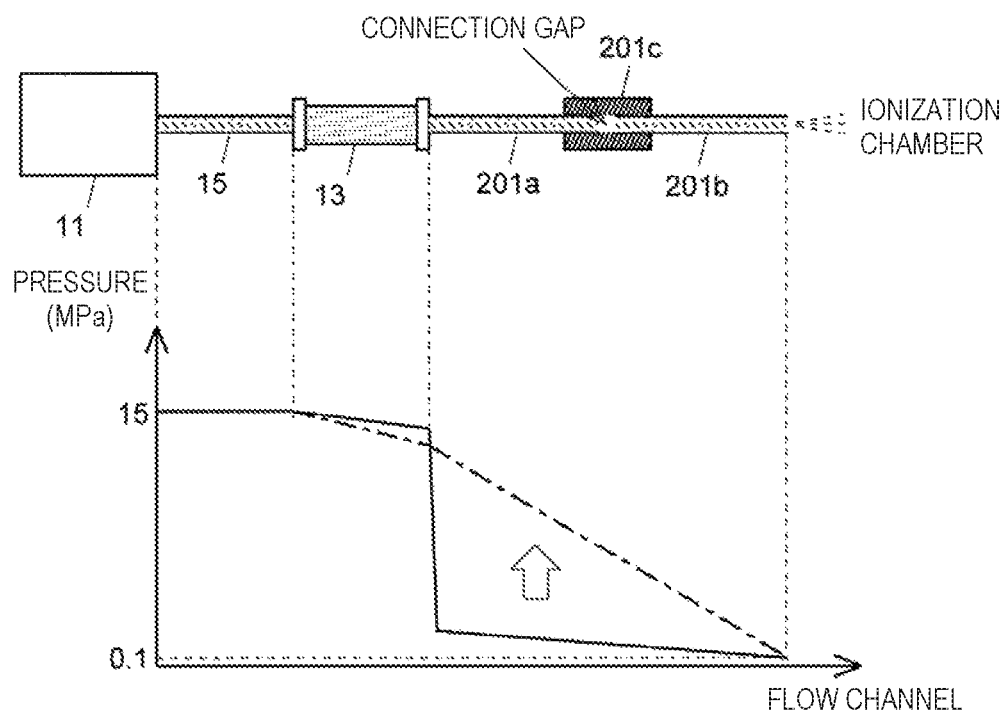
FIG. 2 is a view schematically illustrating a mobile phase flow channel in the liquid chromatograph mass spectrometer of the embodiment.

FIG. 2 schematically illustrates the flow channel from the pump 11 of the liquid chromatograph 1 to the ionization chamber 20 and a change in pressure of the mobile phase flowing through each flow channel. The mobile phase sent by the pump 11 passes through the column 13, and is introduced into the ESI probe 201 connected to the outlet of the column 13. In the ESI probe 201, an inlet-side pipe 201a and an ESI capillary 201b are connected by a pipe connecting jig 201c with a connection gap between both flow channels. The inlet-side pipe 201a is a pipe made of a polyether ether ketone resin (PEEK), and the ESI capillary 201b is a pipe made of fused silica. These are insulators. Thus, the mobile phase is charged by the connection gap formed between the inlet-side pipe 201a and the ESI capillary 201b by applying voltage (ESI voltage) to the pipe connecting jig 201c using the pipe connecting jig 201c made of a conductive material such as stainless steel (SUS). In FIG. 2, outer diameters of the inlet-side pipe 201a and the ESI capillary 201b are the same for the sake of clarity. However, when the outer diameter of the ESI capillary 201b is smaller than the outer diameter of the inlet-side pipe 201a, a protective tube made of PEEK or the like is attached to an outer circumference of the ESI capillary 201b such that the ESI capillary 201b has the same outer diameter as the inlet-side pipe 201a.

As described above, in the liquid chromatograph 1, the mobile phase is sent by the pump 11, and introduced into the column 13 through the liquid sending pipe 15 in the liquid chromatograph 1. Typically, the pressure ranges from several MPa to several tens of MPa when the mobile phase is sent by the pump 11. Thus, the pressure of the mobile phase in the liquid sending pipe 15 also ranges from several MPa to several tens of MPa.

The mobile phase that already passes through the column 13 of the liquid chromatograph 1 passes through the inlet-side pipe 201a of the ESI probe 201, is charged at the connection gap, and reaches the ionization chamber 20 through the ESI capillary 201b. A nebulizer gas, such as nitrogen gas, which is supplied from a nebulizer gas flow channel (not illustrated) provided on the outer circumference of the ESI capillary 201b is blown onto the charged mobile phase at the outlet of the ESI capillary 201b. Consequently, the mobile phase flowing out from the column 13 is nebulized into the ionization chamber 20 as fine charged droplets. The charged droplets nebulized into the ionization chamber 20 are desolvated and ionized, pass through the heating capillary 202, sequentially enter the first intermediate vacuum chamber 21, the second intermediate vacuum chamber 22, and the analysis chamber 23, and are subjected to analysis.

The inside of the ionization chamber 20 is atmospheric pressure. Thus, the pressure of the mobile phase, which is sent by the pump 11 at the pressure of several MPa to several tens of MPa and passes through the liquid sending pipe 15 in the same pressure range passes through the column 13, decreases to atmospheric pressure (0.1 MPa) until the mobile phase reaches the ionization chamber 20 through the inlet-side pipe 201a and the ESI capillary 201b.

The magnitude (gradient) of the pressure drop of the mobile phase depends on a flow channel resistance of each flow channel while the mobile phase passes through the column 13 of the liquid chromatograph 1, the inlet-side pipe 201a of the ESI probe 201 connected to the outlet of the column 13, and the ESI capillary 201b. The flow channel in the column 13 is closely filled with a carrier coated with a stationary phase, an adsorbent, or the like. On the other hand, the flow channel (inlet-side pipe 201a and ESI capillary 201b) from the outlet of the column 13 to the ionization chamber 20 is hollow. Thus, the flow channel resistance of the flow channel from the outlet of the column 13 to the ionization chamber 20 is significantly smaller than the flow channel resistance of the flow channel in the column 13. For this reason, the pressure of the mobile phase sent at several MPa to several tens of MPa does not decrease so much in the column 13, but rapidly decreases when the mobile phase flowing out from the column 13 to reach the hollow inlet-side pipe 201a. FIG. 2 schematically illustrates a state of the pressure change in each flow channel. FIG. 2 illustrates an example of the pressure change when the mobile phase is sent at the same pressure (15 MPa) as the measurement described below.

A result of an experiment (MRM measurement) performed by the inventor using the conventional micro ESI will be described below. Alprazolam ($C_{17}H_{13}ClN_4$) was used as a sample. In the measurement, alprazolam was mixed with the mobile phase solution in which water (saturated vapor pressure of 2.3 kPa at 20° C.) and acetonitrile (saturated vapor pressure of 9.8 kPa at 20° C.) were mixed at 1:1, and the liquid was sent by the pump 11 at a pressure of about 15 MPa. In the first-stage quadrupole mass filter (Q1) 231, the ions having the mass-to-charge ratio (m/z) of 390.5 were selected as the precursor ions, introduced into the collision cell 232 in which collision energy was set to −26.0 eV, and cleaved, whereby the product ions were generated. In the rear-stage quadrupole mass filter (Q3) 233, the ions having the mass-to-charge ratio (m/z) of 281.10 were selected, and intensities of the ions were measured. In a normal analysis using the liquid chromatograph mass spectrometer, only the mobile phase solution is sent by the pump 11, and a predetermined amount of alprazolam is injected by the injector 12. On the other hand, in the experiment, in order to observe an intermittent decrease in ion strength, a solution in which alprazolam was mixed with the mobile phase solution was prepared, and infusion analysis was performed by sending the solution using the pump 11.

Figure 3:
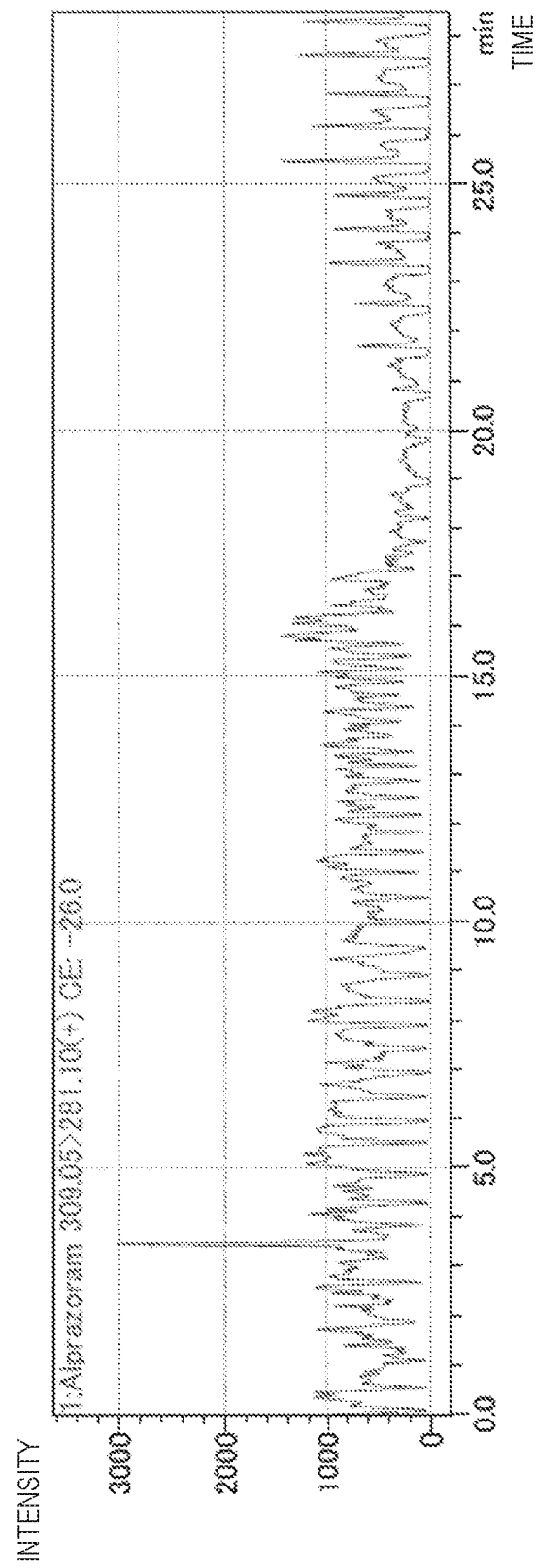
FIG. 3 is a graph illustrating a measurement result of a product ion by infusion analysis of alprazolam using conventional micro ESI.

In the experiment, because alprazolam was injected into the mobile phase by the infusion analysis, the product ions should be measured at constant intensity. However, actually the measured intensity of ions was intermittently decreased as illustrated in FIG. 3.

Water and acetonitrile used as the mobile phase are liquid at room temperature and normal pressure, and the saturated vapor pressures of water and acetonitrile are lower than atmospheric pressure (0.1 MPa). Thus, normally bubbles are not generated in water and acetonitrile even if the pressure of the mobile phase is decreased to several MPa. However, because the pressure of the liquid flowing out from the column 13 of the liquid chromatograph 1 rapidly decreases as described above, the pressure of the liquid is locally lower than the saturated vapor pressure to generate a phenomenon called flash evaporation or cavitation, and the bubbles are generated in the mobile phase. The mobile phase containing the bubbles is introduced into the connection gap, charging of the mobile phase is disturbed by the bubbles, and ion generation efficiency is lowered, which results in the intermittent decrease in the measurement intensity of the ions.

In hydrodynamics, one of the indices that characterize a flow of a viscous fluid (liquid or gas) is called a Reynolds number. A Reynolds number Re is a dimensionless value given by the following equation (1). When a value of the Reynolds number Re is less than or equal to 10, the flow of the fluid is a laminar flow. When a value of the Reynolds number Re is greater than or equal to 2000, the flow of the fluid is a complete turbulent flow.

[Mathematical formula 1]

$$Re = \frac{\rho U d}{\mu} \quad (1)$$

In the equation (1), $\rho$ is density of the fluid, $\mu$ is viscosity of the fluid, U is a flow velocity, and d is a length of the pipe. The Reynolds number Re of about 5 is obtained from the above equation using the parameters of a general liquid chromatograph, and is sufficiently smaller than 2000 that is one of the reference values characterizing the fluid flow. Thus, the flow of the mobile phase in the pipe of the liquid chromatograph is classified as the laminar flow. Because a pipe section of the liquid chromatograph is generally circular, the flow of the mobile phase in the pipe can be handled as the laminar flow in the circular pipe.

In the laminar flow in the circular pipe, a pipe resistance ΔP is given by the following equation (2).

[Mathematical formula 2]

$$\Delta P = \frac{8 \mu Q L}{\pi R^4} \quad (2)$$

In the equation (2), Q is a flow rate, R is an inner diameter of the pipe, and L is a length of the pipe. The cause of generation of an airflow inside the mobile phase is the flash evaporation and the cavitation. In order to prevent the flash evaporation and the cavitation, as indicated by an alternate long and short dashed line in a lower part of FIG. 2, it is necessary to decrease a difference of pipe resistance of the flow channel (the inlet-side pipe 201a and the ESI capillary 201b) from the inside and the outlet of the column 13 to the ionization chamber 20. From the equation (2), the pipe resistance can be increased by reducing the inner diameter R of the inlet-side pipe 201a and/or the ESI capillary 201b or increasing the length L, and the difference of the pipe resistance from the inside of the column 13 can be decreased.

However, because a dead volume increases when the pipe connected after the outlet of the column 13 is lengthened, various components separated by the column 13 are easily diffused in the flow channel, and the analysis accuracy may be degraded. From the equation (2), the pipe resistance is proportional to the length of the pipe, and is proportional to an inverse of the fourth power of the inner diameter of the pipe. That is, the decrease in the inner diameter of the pipe can more efficiently increase the pipe resistance as compared with the lengthening of the pipe. For this reason, preferably the pipe resistance is increased by decreasing the inner diameter of the pipe.

As to the inner diameter of the pipe, the inner diameter of either the inlet-side pipe 201a or the ESI capillary 201b may be decreased. However, the process of decreasing the inner diameter of the PEEK pipe is more difficult and the cost increases as compared with the process of decreasing the inner diameter of the fused silica pipe. For this reason, the inventor considered that preferably the pipe resistance after the outlet of the column 13 is increased by decreasing the inner diameter of the ESI capillary 201b. When the inner diameter of the ESI capillary 201b is decreased, the charging efficiency by applying a high voltage is improved because the solution amount of sample component existing in the capillary is decreased during a certain period of time, and the mobile phase can be easily desolvated because the amount of the sample component flowing out from the leading end of the ESI capillary 201b is decreased, so that synergistic effects such as the improvement of the ionization efficiency of the sample components can be expected.

In the conventional ESI probes for low flow rates, especially the micro ESI for flow rates of 1 μL/min to 50 μL/min, the inner diameter of the inlet-side pipe (polyether ether ketone resin (PEEK) pipe) connected to the outlet of the column ranges from 50 μm to 100 μm, and the length ranges from 20 mm to 200 mm. The inner diameter of the ESI capillary (fused silica pipe) is 50 μm, and the length ranges from 30 mm to 100 mm. The inner diameter and the length of the inlet-side pipe are determined such that the degradation of analysis accuracy due to sample diffusion caused by the dead volume is negligible in the micro ESI for the above flow rate (that is, the inner diameter is less than or equal to 100 μm, and the length is less than or equal to 200 mm). In addition, the inlet-side pipe has the inner diameter enough to excessively increase processing cost of the PEEK pipe (that is, the inner diameter of 50 μm or more), and the length enough to allow connection work between the column and the inlet-side pipe (that is, the length of 20 mm or more). The length of the ESI capillary is a length that can avoid the adverse effects of the dead volume and the enlargement of the ESI probe (that is, the length of 100 mm or less), and is empirically obtained as the length enough to secure the stability of the ionization in the micro ESI (that is, the length of 30 mm or more). Furthermore, the inner diameter of the ESI capillary is small enough to achieve the high ionization efficiency while avoiding the adverse effects of the dead volume in micro ESI for the flow rate, and the inner diameter of the ESI capillary is enlarged as much as possible (that is, the inner diameter of 50 μm) in order to minimize a risk of clogging the capillary. For the conventional micro ESI, the pressure of the solution flowing out from the column falls below the saturated vapor pressure, and the intermittent decrease in strength is observed as illustrated in FIG. 3.

The inventor used the PEEK inlet-side pipe 201a having the inner diameter of 65 μm and the length of 150 mm and the fused silica ESI capillary 201b having the length of 150 mm, and checked that the intermittent decrease in ionic strength as illustrated in FIG. 3 did not occur when the inner diameter of the ESI capillary 201b was decreased to 20 μm. As to the clogging of the ESI capillary that is concerned by decreasing the inner diameter, the inventor checked that the clogging did not occur after about 6 months of use when the inner diameter was 20 μm, and that the clogging was able to be prevented to a frequency that caused no practical problems. It is thought that the intermittent decrease in ionic strength is less likely to be generated because the pipe resistance increases when the inner diameter of the ESI capillary is further decreased. However, when the inner diameter is excessively decreased, the processing cost is increased even in the capillary that is relatively easily processed, and a possibility of clogging of the ESI capillary increases to increase a replacement frequency of the ESI capillary. For this reason, it is preferable that the inner diameter of the ESI capillary is greater than or equal to 10 μm. With this configuration, the inner diameter and the length of conventional inlet-side pipe and the length of the ESI capillary are ensured such that the adverse effects of the pipe dead volume, the enlargement of the ESI probe, and the decrease in ionization efficiency can be avoided. While suppressing the risk of clogging to a practical level, the pressure of the sample solution flowing out from the column can be increased to stabilize the ion strength in the micro ESI.

The above embodiment is merely an example, and can appropriately be modified according to the spirit of the present invention. The configuration of the flow channel and the inner diameter and length of the flow channel in the embodiment are only by way example, and these can be changed as appropriate. The inner diameter and length of the flow channel may be determined according to the configuration of the flow channel of the apparatus actually used. As can be seen from the equation used in the embodiment, the pipe resistance varies depending on the type (viscosity), the flow velocity, the flow rate, and the like of the mobile phase to be used. The columns are roughly classified into two types, namely, a packed column and a capillary column, and the packing rate of the carrier and the adsorbent packed inside is different even if the columns are the same type. As described above, when the inner diameter of the ESI capillary (second pipe) is set to less than or equal to 20 μm, the above problem due to the rapid pressure decrease at the outlet of the column can be solved. When design is made in more detail, the inner diameter and length of the pipe to be used may be determined in consideration of these parameters.

In the embodiment, the liquid chromatograph mass spectrometer has been described as an example. However, the same way of thinking can also be used in a liquid chromatograph including an ion mobility analyzer or a classifier as the detector instead of the mass spectrometer.

REFERENCE SIGNS LIST

1 . . . Liquid Chromatograph
10 . . . Mobile Phase Container
11 . . . Pump
12 . . . Injector
13 . . . Column 14 . . . Autosampler
15 . . . Liquid Sending Pipe
2 . . . Mass Spectrometer
20 . . . Ionization Chamber
201 . . . ESI Probe
201a . . . Inlet-Side Pipe
201b . . . ESI Capillary
201c . . . Pipe Connecting Jig
202 . . . Heating Capillary
21 . . . First Intermediate Vacuum Chamber
211 . . . First Ion Guide
212 . . . Skimmer
22 . . . Second Intermediate Vacuum Chamber
221 . . . Second Ion Guide
23 . . . Analysis Chamber
231 . . . Front-Stage Quadrupole Mass Filter
232 . . . Collision Cell
234 . . . Rear-Stage Quadrupole Mass Filter
235 . . . Ion Detector

The invention claimed is:

1. A liquid chromatograph comprising:
a) a column;
b) a liquid sending unit configured to send a mobile phase to the column at a pressure higher than atmospheric pressure;
c) a first pipe having one end connected to an outlet of the column; and
d) a second pipe having one end connected to an end face at the other end of the first pipe with a connection gap sandwiched between the one end of the second pipe and the end face, the second pipe having the other end disposed in an ionization chamber having a pressure less than or equal to atmospheric pressure,
wherein the liquid chromatograph charges a component of a sample contained in a liquid flowing out from the column by applying voltage to the connection gap,
inner diameters and lengths of the first pipe and the second pipe are determined such that the liquid flowing out from the column passes through the connection gap while maintaining pressure greater than or equal to a saturated vapor pressure of the mobile phase,
a length of the first pipe ranges from 20 mm to 200 mm, an inner diameter of the first pipe ranges from 50 μm to 100 μm, and
a length of the second pipe ranges from 30 mm to 100 mm, and an inner diameter of the second pipe is less than or equal to 20 μm.

\* \* \* \* \*